Oct. 17, 1939.  C. L. REID  2,176,721

DRAFT-GEAR-COUPLER STRUCTURE

Filed May 19, 1938

INVENTOR
Charles L. Reid
BY
ATTORNEY

Patented Oct. 17, 1939

2,176,721

UNITED STATES PATENT OFFICE 2,176,721

DRAFT-GEAR-COUPLER STRUCTURE

Charles L. Reid, Schenectady, N. Y., assignor to American Locomotive Company, New York, N. Y., a corporation of New York Application May 19, 1938, Serial No. 208,778

5 Claims. (Cl. 213—4)

This invention relates to draft-gear-coupler structures, and more particularly to a structure especially adapted for application to a locomotive at the front or pilot end thereof.

The invention has to do with a coupler member which is movable to and from active and inactive positions, and has for its object devising a structure of this characteristic better adapted for service where suitable and especially at the front end of a locomotive.

A further object of the invention is to devise a structure of the aforesaid characteristics wherein the coupler member is operatively connected to means that is associated with a fixed part of the locomotive for movement relative thereto in a direction longitudinally of the locomotive.

A further object of the invention is to provide means for yieldingly resisting said longitudinal movement.

Other objects of and advantages achieved by this invention will be apparent from the following description thereof and the claims appended hereto.

Figure 1:
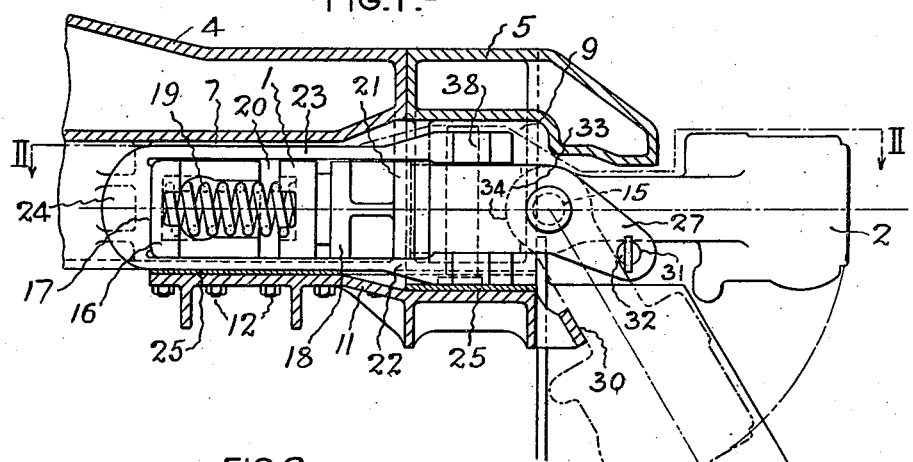
Figure 2:
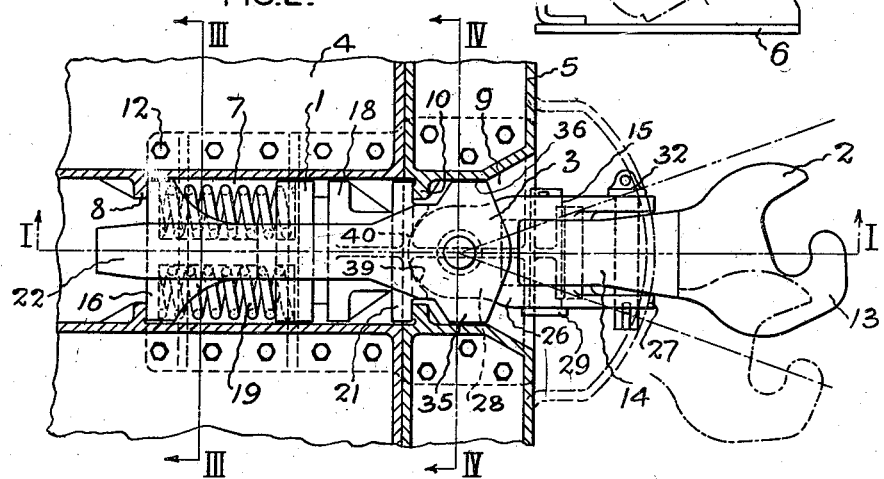
Figure 3:
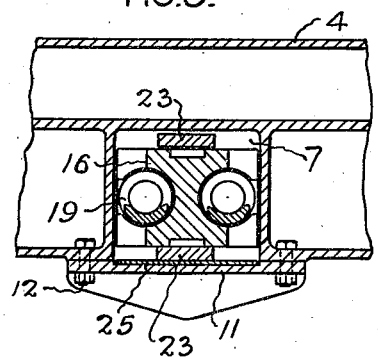
Figure 4:
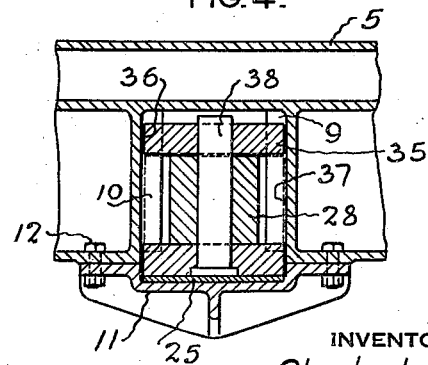

The invention is illustrated in the accompanying drawing wherein Figure 1 is a longitudinal sectional view, on the line I—I of Fig. 2, of a portion of the front end of a locomotive embodying the present invention, the pilot being indicated in full lines, the coupler structure being shown in side elevation and the coupler member in full lines in active position and in dot and dash lines in inactive position; Fig. 2 is a section on the line II—II of Fig. 1, partly shown in dot and dash lines, the structure of the present invention being shown in plan view and the coupler member being shown in one of its active positions and indicated in dot and dash lines in another active position, the pilot not being shown; Fig. 3 is a section on the line III—III of Fig. 2; and Fig. 4 is a section on the line IV—IV of Fig. 2.

The structure of the present invention includes a part, conveniently termed a draft gear and indicated generally by the reference numeral 1, which operates similar to a draft gear; a coupler member 2; and connecting means, indicated generally by the reference numeral 3, connecting the coupler member to the draft gear. Conventional types of coupler members may swing downwardly to active position or upwardly to active position. The latter type is shown for illustrative purposes in the present instance. The coupler member usually also has swinging movement in a horizontal plane, and the connecting means in the present instance also provides for this movement.

The part of the locomotive shown in the drawing comprises a part of the frame 4, a pilot beam 5 secured to the frame at the front thereof, and a pilot 6 secured to the pilot beam. The frame has a housing 7 provided with rear oppositely disposed vertical flanges 8. The pilot beam has a housing 9 open at its front, which forms a continuation of the housing 7, and is provided at the rear with oppositely disposed vertical flanges 10 which serve as forward flanges for the housing 7. The housings are open at their bottoms through which the structure is inserted when assembling it with the locomotive. A cover plate 11 covers the openings and is secured to the adjacent walls thereof by bolts 12.

The coupler member 2 comprises a coupler part 13 and a shank 14 provided at its rear end with a horizontal orifice 15.

The part 1 has the characteristics of a draft gear, and is not confined to any particular design as to its general features. In the present instance it comprises a rear block 16 having a rear face 17 abutting the flanges 8, and a front block 18. The blocks have their vertical side faces in sliding engagement with the vertical side walls of the housing 7. The blocks are chambered for housing therein two helical compression springs 19 disposed in a horizontal plane. A space 20 is provided between the blocks to permit relative movement therebetween and to limit such movement during pulling and buffing forces when the structure is in service. This action is similar to that of the conventional draft gear and therefore requires no detailed description. The springs may be replaced by snubbers, if desired.

A bearing block 21 is disposed between the front of the block 18 and the flanges 10, with side walls slidably engaging the side walls of the housing 7. The springs are normally under a predetermined amount of compression. The block 21, under a buffing force, moves rearwardly further compressing the springs against the resistance of the flanges 8, and the block 16, under a pulling force, moves forwardly further compressing the springs against the resistance of the flanges 10.

A vertically disposed yoke 22, comprising branches 23, and a branch connecting portion 24, embraces the three blocks with the portion 24 at the rear and in engagement with the block 16. This yoke, as will later appear, receives the pulling forces and reacts upon the block 16 to move it forward to compress the springs, as already stated. The yoke rests upon renewable wear plates 25 which seat upon the cover plate 11.

The connecting means 3 for connecting the coupler member 2 to the draft gear 1 comprises a coupler-member supporting means conveniently termed a knuckle 26. The knuckle is of fork formation comprising at its forward portion branches 27, and at its rear portion a horizontally disposed shank 28. The branches 27 provide a vertical slot in which the shank 14 is disposed, the shank 14 being pivotally connected to the branches 27 by a pivot pin 29 extending horizontally through the orifice 15 of the shank and through orifices in the branches.

The coupler member 2 is thus free to rotate in a vertical plane about the pin 29 from active horizontal position, shown in full lines in Fig. 1, to lowered inactive inclined position, within the confines of the pilot 6, as shown in dot and dash lines in said Fig. 1. An inclined bracket 30 formed on the plate 11 projects forwardly from the pilot beam 5, and the coupler member rests upon this bracket when in inactive position.

The branches 27 extend forwardly and are provided with orifices 31 for receiving a coupler-member supporting pin 32. The pin engages the coupler member for supporting same when in active position and is preferably disposed so that it engages the bottom of the shank 14 when in active position and the top of the shank when in inactive position, the pin being removable in order that the coupler member may be swung to and from its two positions.

The rear end of the shank 14 and the front face of the shank 28 are formed respectively as convex and concave cylindrical faces 33 and 34 having, when in engagement, axes substantially coincident with the axis of the pin 29. These curved surfaces are for taking the buffing force, and slight play is provided at the pin 29 to permit this. They are curved so that the coupler member may be freely rotated from and to active and inactive positions.

The connecting means 3 further includes a connection for connecting the supporting knuckle 26 to the draft gear 1. This comprises heads 35 formed at the forward ends of the branches 23 and integral therewith. The heads operate similar to a cross head and have vertical side faces 36 in sliding engagement with side faces 37 of the housing 9, these side faces 37 serving as guides for the connection. The heads are spaced to provide a horizontal slot in which the shank 28 is disposed. The shank 28 engages adjacent faces of the heads and is pivotally connected to the heads by a pivot pin 38 extending vertically through the shank and heads. The knuckle is thus supported in a horizontal position and permitted to rotate about the pin 38 in a horizontal plane carrying the coupler member with it. In other words the coupler member is permitted to swing in a horizontal plane when in active position as is necessary in service, as for instance when passing through curved track. The faces 37 are flared at their forward ends to permit this lateral swing, as shown in Fig. 2.

The rear end of the shank 28 and the front face of the block 21 are formed respectively as convex and concave cylindrical faces 39 and 40 having, when in engagement, axes substantially coincident with the axis of the pin 38. These curved surfaces are for taking the buffing forces, and slight play is provided at the pin 38 to permit this. They are curved so that the knuckle may be freely rotated in a horizontal plane. The pins 29 and 38 take the pulling force.

The structure provides novel features, among which is a coupler member of the type movable to active position and therefrom to inactive out-of-the-way position which, through the springs 19, yieldingly takes the pulling and buffing forces; and further a coupler member, of the aforesaid characteristics, which, in active position, is entirely supported by the structure through the supporting pin 32 which is carried by the structure.

In former practice the pin is carried by a fixed part of the locomotive structure and any movement of the coupler member, such as side sway or horizontal swinging movement, is relative to the supporting pin and therefore produces considerable wear upon the pin. The present structure has the advantage that the supporting pin 32 always moves with the coupler member when in service, both during side sway (horizontal swinging movement) and fore and aft movements produced by pulling and buffing forces, the pin being thus saved from any wear. As a further advantage it will be noted that, due to the cross head action of the connection provided by the heads 35, regardless of the angularity of the coupler member when in active position, the force transmitted to the draft gear by the buffing and pulling forces will be in a direction longitudinally of the locomotive, thereby producing a most satisfactory spring action tending to yieldingly resist these forces.

While there has been hereinbefore described an approved embodiment of this invention, it will be understood that many and various changes and modification in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. In a locomotive, a frame structure having at its front end a longitudinal channel; a pilot beam secured to said frame structure, having an opening in line with said channel, provided with side walls serving as guideways and as lateral thrust bearings, and a bottom wall serving as a support; a pilot secured to said pilot beam having an opening extending to the bottom of said pilot and in alignment with said pilot beam opening; a draft gear housed in said channel comprising a yoke adapted for longitudinal movement and in working sliding relation with the top wall of said channel, said yoke having its legs disposed one above the other, and means disposed between said legs yieldingly restraining said movement, said yoke having its open end housed in said pilot beam opening and slidably supported on said bottom wall, each said leg, at said open end, having side portions slidably engaging said side walls for confining said yoke to said longitudinal movement; a knuckle, entirely supported by said yoke, having a shank disposed between and having a working fit with said legs at their forward ends; a vertical pivot pin extending through said legs and said shank in line with said side portions for rendering said knuckle horizontally swingable about the axis of said pivot pin relative to said yoke, and for transmitting lateral thrusts to said side walls, said knuckle having spaced vertical legs extending forwardly from said shank; a coupler having a shank disposed between said knuckle legs; and a horizontal pivot pin extending through said coupler shank and said knuckle legs for rendering said coupler horizontally swingable with said knuckle and vertically swingable, about the axis of said horizontal pivot pin, relative to said knuckle, downward within the opening of said pilot to an inactive position.

2. In a locomotive, a frame structure having at its front end a longitudinal channel; a pilot beam secured to said frame structure, having an opening in line with said channel, provided with side walls serving as guideways and as lateral thrust bearings, and a bottom wall serving as a support; a pilot secured to said pilot beam having an opening extending to the bottom of said pilot and in alignment with said pilot beam opening; a draft gear housed in said channel comprising a yoke adapted for longitudinal movement and in working sliding relation with the top wall of said channel, said yoke having its legs disposed one above the other, and means disposed between said legs yieldingly restraining said movement, said yoke having its open end housed in said pilot beam opening and slidably supported on said bottom wall, each said leg, at said open end, having side portions slidably engaging said side walls for confining said yoke to said longitudinal movement; a knuckle, entirely supported by said yoke, having a shank disposed between and having a working fit with said legs at their forward ends; a vertical pivot pin extending through said legs and said shank in line with said side portions for rendering said knuckle horizontally swingable about the axis of said pivot pin relative to said yoke, and for transmitting lateral thrusts to said side walls, said knuckle having spaced vertical legs extending forwardly from said shank; a coupler having a shank disposed between said knuckle legs; a horizontal pivot pin extending through said coupler shank and said knuckle legs for rendering said coupler horizontally swingable with said knuckle and vertically swingable, about the axis of said horizontal pivot pin. relative to said knuckle, downward within the opening of said pilot to an inactive position; and a horizontal bar detachably carried by said knuckle supporting said coupler when in active position whereby through cooperation of said horizontal bar and said horizontal pivot pin, said coupler when in uncoupled active position is entirely supported by said knuckle, said bar when detached freeing said coupler for vertical swinging to inactive position about said axis of said horizontal pin.

3. In a locomotive, a frame structure having at its front end a longitudinal channel; a pilot beam secured to said frame structure, having an opening in line with said channel, provided with side walls serving as guideways and as lateral thrust bearings, and a bottom wall serving as a support; a pilot secured to said pilot beam having an opening extending to the bottom of said pilot and in alignment with said pilot beam opening; a draft gear housed in said channel comprising a yoke adapted for longitudinal movement and in working sliding relation with the top wall of said channel, said yoke having its legs disposed one above the other, and means disposed between said legs yieldingly restraining said movement, said yoke having its open end housed in said pilot beam opening and slidably supported on said bottom wall, each said leg, at said open end, having side portions slidably engaging said side walls for confining said yoke to said longitudinal movement; a knuckle, entirely supported by said yoke, having a shank disposed between and having a working fit with said legs at their forward ends; a vertical pivot pin extending through said legs and said shank in line with said side portions for rendering said knuckle horizontally swingable about the axis of said pivot pin relative to said yoke, and for transmitting lateral thrusts to said side walls, said knuckle having spaced vertical legs extending forwardly from said shank; a coupler having a shank disposed between said knuckle legs; a bracket disposed in said opening of said pilot, for engaging said coupler shank for supporting said coupler when in inactive position; and a horizontal pivot pin extending through said coupler shank and said knuckle legs for rendering said coupler horizontally swingable with said knuckle and vertically swingable, about the axis of said horizontal pivot pin relative to said knuckle, downward within the opening of said pilot to said inactive position.

4. In a locomotive, a frame structure having at its front end a longitudinal channel having an open bottom; a pilot beam secured to said frame structure, having a channel-shaped opening open at the bottom in line with said frame channel, provided with side walls serving as guideways and as lateral thrust bearings; a plate covering said open bottoms and detachably secured to said frame and said pilot beam; a pilot secured to said pilot beam having an opening extending to the bottom of said pilot and in alignment with said pilot beam channel; a draft gear housed in said channels comprising a yoke adapted for longitudinal movement and in working sliding relation with the top wall of said frame channel, said yoke having its legs disposed one above the other, and means disposed between said legs within said frame channel yieldingly restraining said movement, said yoke having its open end housed in said pilot beam channel and slidably supported on said plate, each said leg, at said open end, having side portions slidably engaging said side walls for confining said yoke to said longitudinal movement; a knuckle, entirely supported by said yoke, having a shank disposed between and having a working fit with said legs at their forward ends; a vertical pivot pin extending through said legs and said shank in line with said side portions for rendering said knuckle horizontally swingable about the axis of said pivot pin relative to said yoke, and for transmitting lateral thrusts to said side walls, said knuckle having spaced vertical legs extending forwardly from said shank; a coupler having a shank disposed between said knuckle legs; an inclined bracket projecting forwardly from said pilot beam in said pilot opening for supportingly engaging said coupler when in inactive position; and a horizontal pivot pin extending through said coupler shank and said knuckle legs for rendering said coupler horizontally swingable with said knuckle and vertically swingable, about the axis of said horizontal pivot pin, relative to said knuckle, downward within the opening of said pilot to said inactive position.

5. In a locomotive, a frame structure; a support for a coupler; a mounting for said support, carried by said structure, said support having a vertical pivotal connection with said mounting rendering said support horizontally swingable relative to said mounting about the axis of said connection; a coupler having a shank, carried by said support, having a horizontal pivotal connection with said support rendering said coupler vertically swingable relative to said support about the axis of said horizontal connection; and a horizontal bar detachably carried by said support supporting said coupler when in active position, said bar when removed freeing said coupler for vertical swinging to inactive position about said axis of said horizontal connection.

CHARLES L. REID.